United States Patent
Igarashi et al.

(10) Patent No.: US 6,427,668 B1
(45) Date of Patent: *Aug. 6, 2002

(54) THERMAL-TYPE AIRFLOW METER, INTAKE AIR SYSTEM FOR AN INTERNAL COMBUSTION ENGINE, AND CONTROL SYSTEM FOR THE SAME

(75) Inventors: Shinya Igarashi, Naka-machi; Akira Takasago; Masayuki Kozawa, both of Hitachinaka; Kaoru Uchiyama, Oomiya-machi; Mitsukuni Tsutsui, Naka-machi, all of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/769,366

(22) Filed: Jan. 26, 2001

Related U.S. Application Data

(63) Continuation-in-part of application No. 09/475,276, filed on Dec. 30, 1999, now Pat. No. 6,182,639, which is a continuation of application No. 09/105,050, filed on Jun. 26, 1998, now Pat. No. 6,012,432.

(30) Foreign Application Priority Data

Jun. 26, 1997 (JP) .............................................. 9-170630

(51) Int. Cl.[7] .............................. G01F 1/68; F02M 69/48
(52) U.S. Cl. ..................... 123/494; 73/204.22; 73/118.2
(58) Field of Search ........................ 73/118.2, 204.11, 73/204.22; 123/494, 198 E

(56) References Cited

U.S. PATENT DOCUMENTS

| | | | |
|---|---|---|---|
| 4,887,577 A | * 12/1989 | Arai et al. ................... 123/494 |
| 5,186,044 A | * 2/1993 | Igarashi et al. ............ 73/118.2 |
| 5,537,870 A | * 7/1996 | Zurek et al. .................. 73/202 |
| 5,672,822 A | * 9/1997 | Sawada et al. ............ 73/202.5 |
| 5,696,321 A | * 12/1997 | Igarashi et al. ............ 73/202.5 |
| 5,756,893 A | * 5/1998 | Kondo et al. ............ 73/204.22 |
| 5,789,673 A | * 8/1998 | Igarashi et al. ............ 73/202.5 |

FOREIGN PATENT DOCUMENTS

JP 9-170630 * 10/1997

* cited by examiner

*Primary Examiner*—Andrew M. Dolinar
*Assistant Examiner*—Arnold Castro
(74) *Attorney, Agent, or Firm*—Crowell & Moring LLP

(57) ABSTRACT

The thermal-type airflow meter comprises airflow meter body 86 and measuring part 87. Both of the frame 31 of the housing 3 accommodating therein the electronic circuit 6 and the subpassage member 4 having the heating resistor 1 etc. positioned within a subpassage of air are arranged on the metallic base 5. Further, the frame 31, the subpassage member 4, the metallic base 5 and the cover 9 are adhered to respectively different member more than one. The connector 32 of the housing 3, the frame 31 and the subpassage member 4 are formed in a flat shape to form the measuring module 87. The measuring module 87 is inserted through the insertion hole 83 to locate the heating resistor 1 within the main air passage 81, and the fixing flange 36 of the housing 3 is fixedly attached to the airflow meter body 86.

4 Claims, 6 Drawing Sheets

THERMAL-TYPE AIRFLOW METER, INTAKE AIR SYSTEM FOR AN INTERNAL COMBUSTION ENGINE, AND CONTROL SYSTEM FOR THE SAME

This application is a continuation of application Ser. No. 09/475,276, filed Dec. 30, 1999, now U.S. Pat. No. 6,182, 639, which is a continuation of Ser. No. 09/105,050, filed Jun. 26, 1998, now U.S. Pat. No. 6,012,432.

BACKGROUND OF THE INVENTION

1. Field of the Invention

The present invention relates to a thermal-type airflow meter suitable for measuring the flow rate of air taken into an internal combustion engine, and more particularly to a thermal-type airflow meter, which comprises a housing for protectingly accommodating an electronic circuit therein and a. sub-air passage.

2. Description of the Related Art

JP-A 3-233168 discloses an example of prior art thermal-type airflow meters. In this prior art, a housing part for protectingly accommodating an electronic circuit therein and a sub-air passage part are arranged in the same plane to be made one body. Further, there is also proposed an airflow meter, in which a housing and a sub-air passage are plastic-molded as a unitary body.

However, the prior art as mentioned above was necessary to be further improved in the following points:

(1) A member, in which a housing and a sub-air passage are formed, has the shape suitable for assembling by means of insertion technology (to be proper in the dimension of an inserting hole and the size of a member to be inserted);

(2) The positional relationship of a housing and a sub-air passage never varies. That is, after the sub-air passage was fixedly attached to a member, in which a main air passage is formed, the attaching position of the subair passage never varies;

(3) The deformation of an airflow meter due to the environmental condition of usage is as small as possible, and the durability and reliability thereof is to be sufficient; and (4) There is the freedom in designing the shape of a sub-air passage, and further even if it has the complicated shape, it can be easily manufactured.

SUMMARY OF THE INVENTION

An object of the present invention is to provide a thermal-type airflow meter which can measure the flow rate of air at the high accuracy and has the excellent durability and reliability against the environment of usage. Further, the present invention provides an intake air system for an internal combustion engine and a control system therefor, which is high in its control ability and reliability.

A thermal-type airflow meter according to a feature of the present invention comprises a sub-air passage which is installed therein with a flow rate measuring part including a heating resistor and a housing, arranged next to the sub-air passage, which accommodates therein an electronic control part for controlling the heating of the flow rate measuring part, wherein the sub-air passage and the housing are plastic-molded separately, then fixedly attached to each other and put on a flat metallic base member with the mechanical strength in its longitudinal direction, whereby the sub-air passage and the housing are fixed on the metallic base member.

Preferably, in the adhesion among the sub-air passage, the housing and the metallic base member, a face, on which different two of the aforesaid members come into contact with each other, is commonly owned by the two members.

According to another feature of the present invention, a thermal-type airflow meter has a sub-air passage having at least one bent portion, through which a part of air in a main air passage as an intake air passage of an internal combustion engine flows, a heating resistor arranged within the sub-air passage and an electronic circuit, electrically connected to the heating resistor, for producing a signal according to an air flow rate on the basis of heat radiated by the heating resistor, wherein a housing protectingly accommodating therein the electronic circuit is composed of a frame part surrounding the electronic circuit, a connector part with connector terminals for electrically connecting the electronic circuit with external devices, and fixing mounts for fixedly supporting the heating resistor on the opposite side to the connector part with respect to the frame part, all of which being plastic-molded as one body, in which a member for forming the sub-air passage is a plastic-molded article and at least the frame part of the housing and the sub-air passage member are formed in a flat shape and fixedly arranged on a flat metallic base member in the longitudinal direction thereof so as to locate the heating resistor in the sub-air passage.

According further to another feature of the present invention, a housing protectingly accommodating therein the electronic circuit comprises a frame part surrounding the electronic circuit, a connector part with connector terminals for electrically connecting the electronic circuit with external devices, and fixing mounts for fixedly supporting the heating resistor on the opposite side to the connector part with respect to the frame part, all of which being plastic-molded as one body, in which a member for forming the sub-air passage is a plastic-molded article and at least the frame part of the housing and the sub-air passage member are formed in a flat shape and fixedly arranged on a flat metallic base member in the longitudinal direction thereof, and there is provided a cover for covering an opposite side of the metallic base member to the frame part, which cover is fixed both to the housing and the sub-air passage member, whereby the frame part is covered by the metallic base member on one side and by the cover on the opposite side to thereby form a closed room for accommodating therein the electronic circuit.

The thermal-type airflow meter according to the present invention can be attached to a part of a body of an air cleaner. Further, an intake air system for a combustion engine performs the fuel control using such airflow meter.

According to the present invention, since a housing and a member of a sub-air passage are separately plastic-molded, the dimension of both in the longitudinal direction can be shortened. As a result, the initial dimensional change of those members during molding can be suppressed, and the housing and the sub-air passage member are adhered to each other and both are fixedly arranged on a metallic base member with the mechanical strength to suppress the dimensional change upon assembling and the aged one.

With these, the dimensional accuracy can be secured and the influence of the dimensional change on the measuring accuracy can be reduced, whereby the accurate measurement of the air flow rate can be achieved. Further, one member is adhered to more than one member which is different from each other. Accordingly, the frequency of separation or removal of two members is remarkably reduced, with the result that the durability and reliability of the airflow meter is much improved.

DETAILED DESCRIPTION OF THE EMBODIMENTS

In the following, description will be made of embodiments of the present invention, referring to the accompanying drawings.

Figure 1:
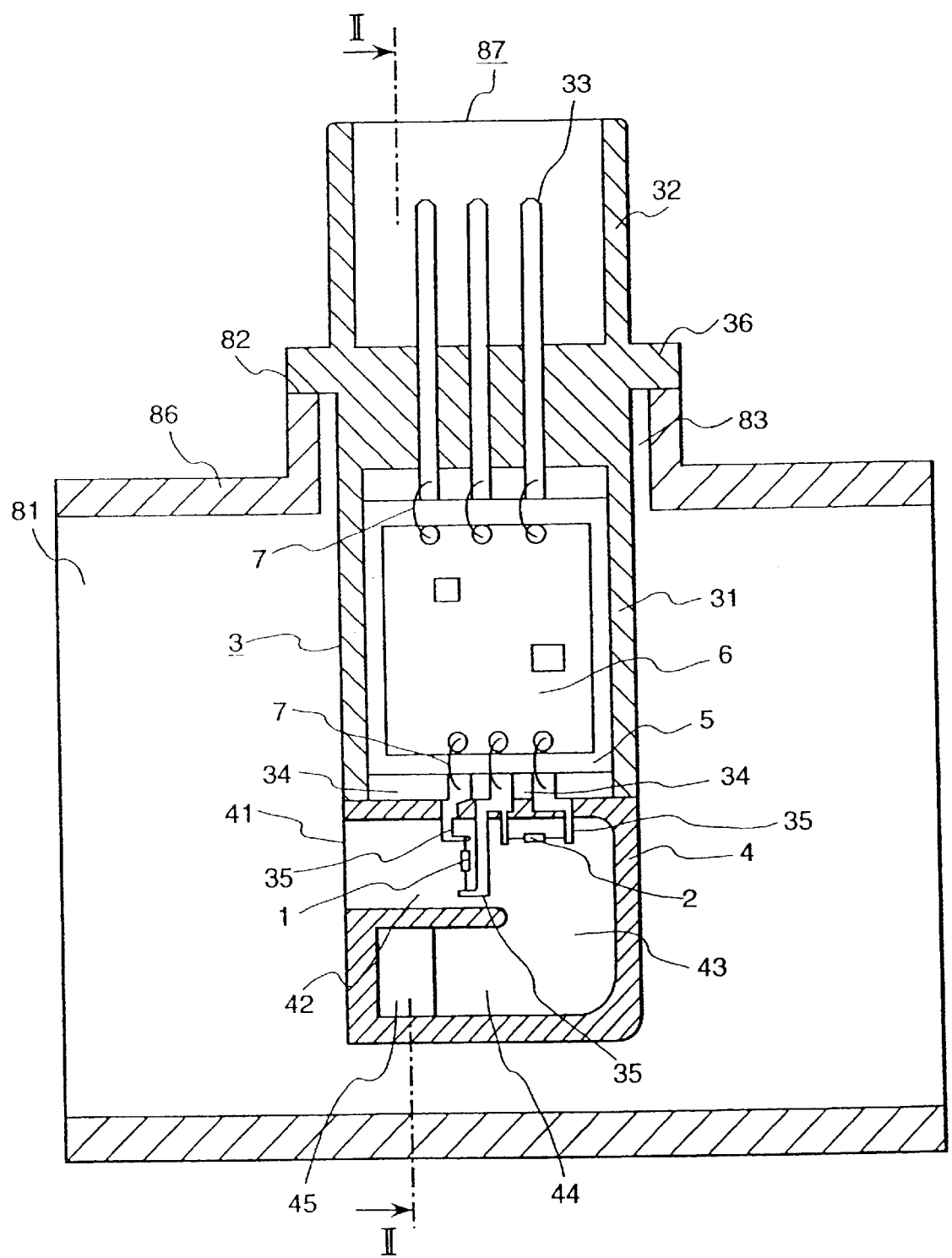
FIG. 1 schematically shows a sectional view of a thermal-type airflow meter according to an embodiment of the present invention.
Figure 2:
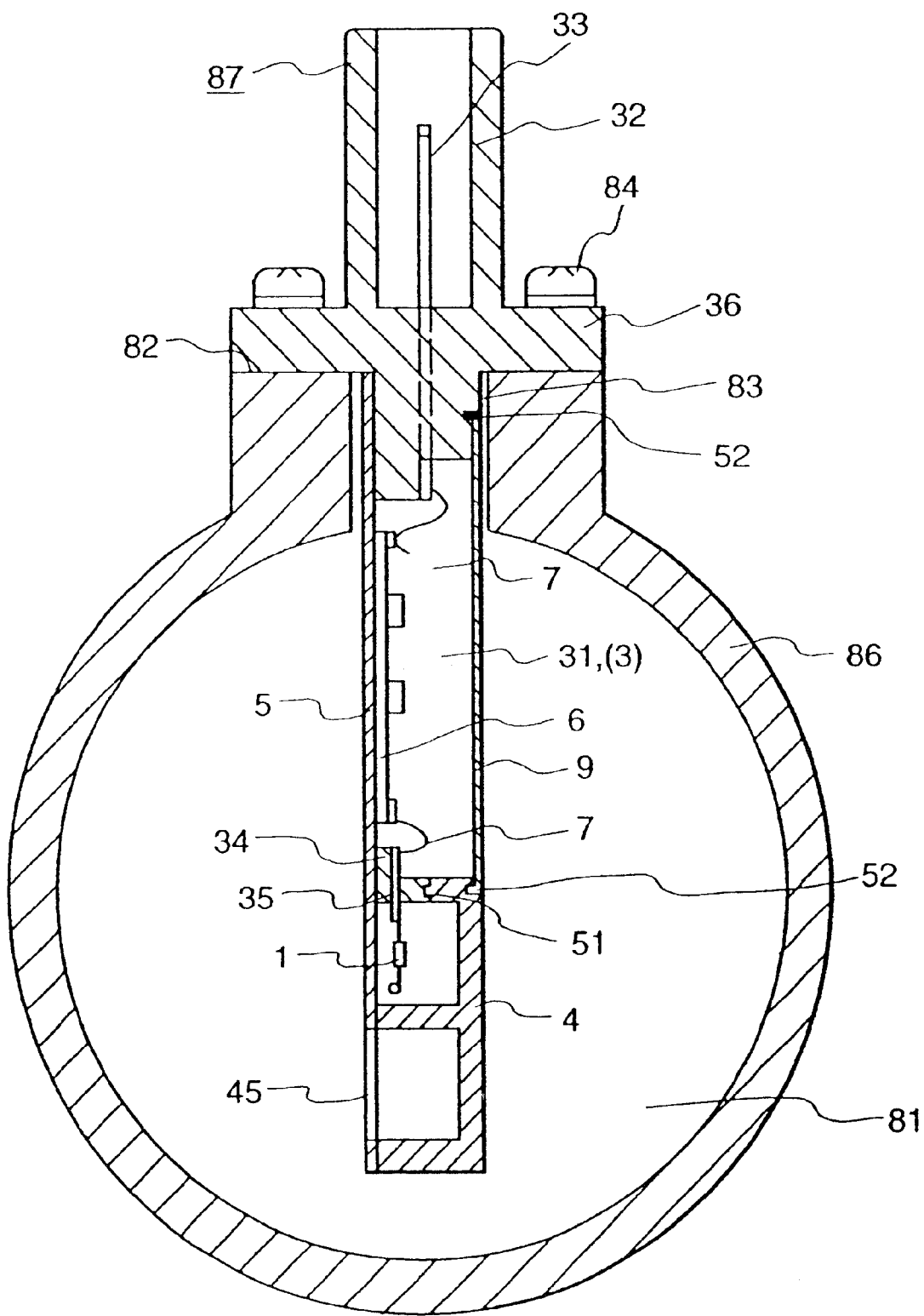
FIG. 2 shows a cross section of the airflow meter, as shown in FIG. 1, along the line II—II.

Referring at first to FIGS. 1 and 2, a thermal-type airflow meter according to a first embodiment of the present invention will be described, wherein FIG. 1 schematically shows the sectional view of the airflow meter and FIG. 2 shows the cross section of the airflow meter, as shown in FIG. 1, along the line II—II.

As shown in these figures, the thermal-type airflow meter of the first embodiment is composed of airflow meter body 86, within which main air passage 81 is formed, and measuring part 87 having a measuring element positioned within the main air passage 81 to measure the flow rate of air flowing therethrough. Further, in the following, only the measuring part 87 is sometimes called a thermal-type airflow meter, or simply an airflow meter.

The measuring part 87 includes heating resistor 1 for the flow rate measurement, thermistor 2 for the air temperature measurement, plural terminals 35 for supporting the heating resistor 1 and the thermistor 2, and circuit substrate 6 for an electronic circuit. The measuring part 87 further comprises housing 3 having a room, which has openings on both sides thereof and accommodates therein the circuit substrate 6, and fixedly holding the supporting terminals 35.

Figure 2A:
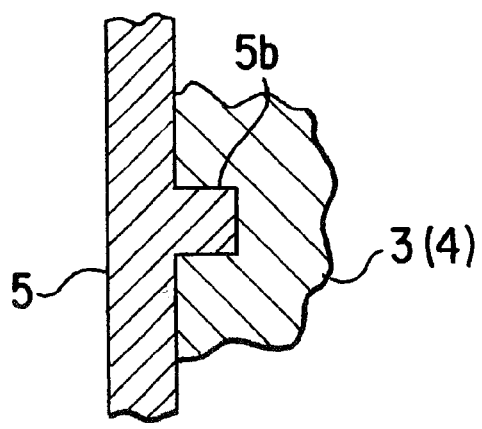

FIGS. 2a and b are enlarged cross views of metallic base member 5 in FIG. 2, showing the details, projections and grooves for coupling in parts together.

To the housing 3, there is attached member 4 with a sub-air passage formed therein almost in the U-character shape (one of both ends thereof being opened). The heating resistor 1 and the thermistor 2 are positioned in the sub-air passage.

Furthermore, the measuring part 87 comprises metallic base 5, on which the circuit substrate 6 is provided and which functions as a first covering member for covering both the opening on one side of the room of the housing 3 and the open end of the sub-air passage together. Further, there is provided cover 9 as a second covering member for covering the opening on the other side of the room of the housing 3.

The housing 3 is an article of plastic material molded as a unitary body, which includes frame part 31 forming the room accommodating therein the circuit substrate 6 for the protection thereof, connector part 32 with terminal connectors 33 for providing the electric connection with external devices, fixing part 34 for fixedly holding the plural terminals 35 for supporting the heating resistor 1 and the thermistor 2, and flange 36 for fixing. The housing 3, and at least the frame part 31 thereof, is formed in a flat shape.

The thermistor 2 is a resistor for sensing the temperature of the intake air, by which the difference between the temperature of the heating resistor 1 and that of the intake air is controlled to be kept constant.

The heating resistor 1 and the thermistor 2 are fixed by welding to the supporting terminals 35. The housing 3 is a plastic-molded article, in which terminals and others are planted in advance, and therefore there exists no obstacle to electrodes for the welding and chucks for holding the resistor 1 or the thermistor 2 around the portion of welding the resistor 1 and the thermistor 2 to the terminals 35. Therefore, the workability in assembling is excellent.

To the housing 3, there is attached the subpassage member 4, which is also made by plastic-molding in a flat shape with a certain thickness and further grooved in a shape of U-character. As described later, the groove is covered by a metallic base member, so that a sub-air passage is formed in the subpassage member 4. The sub-air passage is composed of inlet opening 41 as an inlet of the sub-air passage, first path 42, bent portion 43, second path 44 and outlet opening 45 as an outlet of the sub-air passage.

The inlet opening 41 opens against the air flow. The first path 42 extends from the opening 41 along the air flow, in which the heating resistor 1 and others are accommodated. The second path 44 is arranged in parallel with the first path 42, but apart from the housing 3. The bent portion 43 is positioned at one end of the first path 42 on the opposite side to the inlet opening 41 and almost U-turns, whereby the first and second paths 42, 44 can be communicated with each other. The outlet opening 45 is positioned on the opposite side to the juncture of the second path 44 and the bent portion 43 and opens almost next to the inlet opening 41 in the direction perpendicular to the plane of the inlet opening 41.

With such structure of the sub-air passage, in FIG. 1, air entered from the inlet opening 41 advances through the fist path 42 from left toward right in the drawing, which turns its direction in the bent portion 43 and advances through the second path 44 toward left in the drawing. The thus turned air flow is discharged from the outlet opening 45 in the direction perpendicular to the surface of the drawing (from the surface toward the back, of the drawing in the case as shown).

As shown in FIG. 2, the subpassage member 4 is attached to the housing 3 at juncture 51 and to the cover 9 at juncture 52. When the subpassage member 4 is attached to the housing 3, a part of a metallic base member as described later covers the groove made in the subpassage member 4 so that the sub-air passage as mentioned above is formed.

The metallic base 5 is manufactured out of steel plate by press punching, for example, to be in the form of a flat rectangle. The circuit substrate 6 is installed on the metallic base 5, which covers both the open side of the space of the housing 3 and a part of the groove formed in the subpassage member 4 together, so that the frame part 31 and the subpassage member 4, both being formed flat, are held next to each other.

Figure 2B:
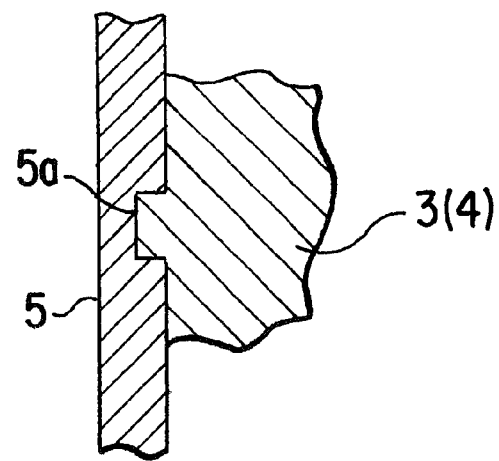

Parts existing between the connector part 32 of the housing 3, on one side, and the subpassage member 4, on the opposite side, are arranged in a single plane, putting the frame part 31 of the housing 3 therebetween. In other words, at least the frame part 31 of the housing 3 and the subpassage member 4 are formed in a flat shape and fixedly arranged on the flat metallic base 5 in its longitudinal direction. Further, as shown in FIGS. 2a and 2b, the metallic base 5 is provided with projections 5b for connecting and grooves 5a for positioning, which are used in order that the metallic base member 5 is coupled with the housing 3 and the subpassage member 4 to cover them.

Therefore, the feature of the thermal-type airflow meter according to the present invention resides in that the housing 3 and the subpassage member 4 are formed separately and then adhered to each other to be arranged on the flat metallic base 5 with the mechanical strength in its longitudinal direction, whereby both the housing 3 and the subpassage member 4 are fixedly attached to the metallic base 5.

With the airflow meter constructed as above, since the housing 3 and the subpassage member 4 are prepared separately, the length thereof in their longitudinal direction can be shortened, compared with the conventional one that both members are initially formed in one body. As a result, the initial change in the dimension of both members, which can occur during plastic-molding, is made small. The initial change in the dimension of both members in the separate molding can be reduced down to ¼, compared with that in such member molded as one body.

Since the metallic base 5 can have the necessary mechanical strength, it can be used for a support serving as a dimensional standard, when an airflow meter is assembled. This enables the accurate assembly of an airflow meter. Further, since the metallic base 5 is difficult to change with age, the aged variation in the dimension of the housing 3 and the subpassage member 4 fixedly attached to the metallic base 5 can be prevented. Accordingly, the influence of the dimensional change in an airflow meter on the measurement accuracy can be remarkably reduced.

On the other hand, the cover 9 is made out of plastic material or steel and covers the other open side of the housing 3. Further as described later, the cover 9 can be integrated with the subpassage member 4 and further with the metallic base 5. Therefore, the cover 9 can be constructed in a given manner. As shown in FIG. 2, the cover 9 can be coupled with the housing 3 and the subpassage member 4 by the connecting portion 52, such as positioning grooves, for example.

As shown in the figures and described above, each of the separately manufactured members, such as the housing 3, the subpassage member 4, the metallic base 5 and the cover 9, is constructed so as to have junctions by which it is coupled with two other members. In other words, according to a feature of the thermal-type airflow meter according to the present invention, each one of the housing, the sub-air passage and the metallic base member is fixed to another member so as to have common surfaces, on which two different members are coupled with each other.

With the structure as above, a member is fixed in two connecting surfaces of different members. Therefore, the frequency of occurrence of separation or removal of the members is reduced. More preferably, there are provided (1) more than one connecting surface, or (2) two connecting surfaces having the directions different from each other (a horizontal connecting surface and a vertical one, for example).

In the following, description will be done of an example of a process of assembling.

First of all, the housing 3 and the subpassage member 4 are fixedly attached to the metallic base 5, on which the circuit substrate 6 is installed also. Then, the circuit substrate 6 and the connector terminals 33 as well as the supporting terminals 35 are electrically connected by conductive leads 7. After that, the cover 9 is fixed to the housing 3 and the subpassage member 4. In this manner, the measuring part 87 is constructed as a module, in which a housing and a sub-air passage are integrated as one body (also referred to as a measuring module in the following).

On the other hand, the airflow meter body 86 is formed by a cylindrical member as a main element, which defines the main air passage 81. Insertion hole 83 is made in the wall of the cylindrical member, and attaching mount 82 is provided around the hole 83. The airflow meter body 86 like this can be manufactured by plastic-molding or by metal-casting.

The assembly of the housing 3 and the subpassage member 4, i.e., the measuring module 87, is inserted into the airflow meter body 86 through the insertion hole 83 such that the subpassage member 4 of the measuring module 87 is positioned in an appropriate area within the main air passage 81. The thus inserted measuring module 87 is fixed to the airflow meter body 86 by fixing the flange 36 of the housing 3 to the attaching mount 82 by screws 84.

As described above, a portion of the measuring module 87, which exists within the main air passage 81, i.e., mainly composed of the frame part 31 of the housing 3 and the subpassage member 4, is formed in the flat shape, as shown in FIG. 2. Further, when the portion is sectioned perpendicularly to the inserting direction, the sectional form in substantially the same everywhere in the inserting direction as the form of the case which is formed by the frame part 31 of the housing 3, the metallic base 5 and the cover 9 to accommodate the circuit substrate 6.

Therefore, the measuring module 87 can be made the minimum size necessary for the circuit substrate 6. As a result, the size of the insertion hole 83 to be bored in the airflow meter body 86 can be made as small as possible in accordance with the necessity, and therefore the width of the inserted module that is an obstacle against air flow within the main air passage 81 can be also made thin. Accordingly, an airflow meter, which is compact in size and easy to lay out as well as has less flow resistance in a main air passage, can be realized.

That is to say, a thermal-type airflow meter according to the present invention is provided with a body member exclusively used for an airflow meter, in which a main air passage is formed. The body member has an insertion hole and a fixing mount. The insertion hole is used to insert a subpassage member and a part of a housing therethrough. The subpassage member and the part of the housing are attached on a metallic base, which is inserted through the insertion hole so as to be in parallel with the direction of air flow within the main air passage.

Further, the part of the housing is fixed to the fixing mount of the body member such that the subpassage member is positioned thereinside, i.e., within the main air passage and the connector part of the housing is positioned outside the body member.

The brief summary is as follows. There might be a considerable length from the connector part 32, as a tip end (one end) of the measuring module 87, to the subpassage member 4, as a terminal end (the other end) thereof. Since, however, the housing 3 and the subpassage member 4 are made as separate plastic molded articles, the warp and distortion can be drastically reduced, which had to be considered when the housing 3 and the subpassage member 4 are formed as a plastic-molded article of one body.

Further, since both are attached to the metallic base 5, the warp and distortion as mentioned above can be suppressed to a great extent. The dimensional error can also be reduced, when two members are assembled. In particular, when the subpassage member 4 is attached to the housing 3, the error easily occurs in the attaching angle between both members, since the sectional form of both members sectioned perpendicularly to the inserting direction is thin. In general, therefore, it is difficult that those two members are assembled as a straight structure without a base member. Such problem is solved by the present invention, however.

The housing 3 and the subpassage member 4 are made out of plastic material, which is easily deformed by the change of the environmental condition of usage, especially by the temperature change. According to the present invention, however, since they are fixed on the metallic base 5, which is mechanically strong and not easily to be deformed by the temperature change, the degradation of durability of an airflow meter can be prevented.

That is, because a housing and a subpassage member are manufactured separately, the initial dimensional change of both members, which occurs during molding, can be suppressed as small as possible. Further, because both members are attached to a metallic base member, the aged dimensional change thereof can be also suppressed. As a result, the dimensional accuracy can be secured and therefore the influence of the dimensional change on the measuring accuracy of an airflow meter can be removed.

As apparent from the above description, the metallic base 5 is adhered to both the housing 3 and the subpassage member 4. If viewed from the housing 3, it is adhered not only to the metallic base 5, but also to the subpassage member 4 and the cover 9. If viewed from the subpassage member 4, it is adhered to the metallic base 5, the housing 3 and the cover 9. Further, the cover 9 is adhered to the housing 3 and the subpassage member 4.

In this manner, one of members is always adhered to more than one member, which are different from each other. Therefore, even if there exists the condition that the adhesiveness of a first member and a second one is worsened (because of poor cleansing of adhering surfaces, inappropriate adhering work, etc.), the separation or removal of the two members can be prevented, because the first member is also adhered to a third member, and further to a fourth one, if applicable.

When a member is coupled to another one, the member has not only a common adhering surface to the another one, but also another common adhering surface to a third one. Since, therefore, a member is always adhered to different members more than one, the durability and reliability of an airflow meter is much improved.

Moreover, the measuring module 87 is constructed by just piling up the housing 3, the subpassage member 4, the circuit substrate 6 and the cover 9 on the metallic base 5 in the order as enumerated. Therefore, the productivity of the airflow meter is excellent. In order to further reduce the number of parts, the subpassage member 4 and the cover 9 can be plastic-molded as one body, as described later.

The reasons why the subpassage member 4 is formed in the U-character shape are that the measuring accuracy is prevented from being worsened due to the pulsation in air flow, as well as that the heating resistor 1 is prevented from suffering the aged deterioration due to the contamination.

Another feature of a thermal-type airflow meter according to the present invention resides in that a sub-air passage is composed of a first path and a second path in parallel with each other, wherein the first path extends along the plane, in which heating resistor fixing mounts of a housing frame part are formed, and the second path is positioned in the same as the plane of the first path and the housing and apart from the housing with respect to the first path.

Further, one end of the first path opens perpendicularly to the plane, in which the heating resistor fixing mounts are formed, to form an inlet of a sub-air passage, and the other end thereof is closed in the vertical direction and opens at the boundary of the second path, whereby the first path is communicated with the second path.

The second path opens perpendicularly to the plane of the inlet opening of the sub-air passage at the end on the same side that the inlet of the sub-air passage in the first path is formed, whereby the outlet of the sub-air passage is formed. Accordingly, the sub-air passage is formed in the U-character shape as a whole, between the inlet and the outlet.

There is a case where a portion of the sub-air passage, at which a thermistor is positioned, is made most narrow. Even in such case, the cross-sectional area can be freely determined, since the width of the sub-air passage varies by changing the depth of groove of a shell-like article.

In this manner, according to the present invention, a sub-air passage, the shape of which is freely selected, can be plastic-molded as one body. Therefore, a sub-air passage is made in a most appropriate shape according to the variation of engine, only if a part of a sub-air passage is altered without any change in other parts.

That is to say, another feature of the present invention is that a portion of a metallic base member, which forms an inner wall of a sub-air passage, is made substantially flat, that a shell-like member forming a sub-air passage has bottom surfaces having levels different in the depth, and that the space between a surface forming a metallic base member and a bottom surface of the shell-like member formes a sub-air passage, the width of which varies.

In the following, description will be made of another embodiment of the present invention.

Figure 3:
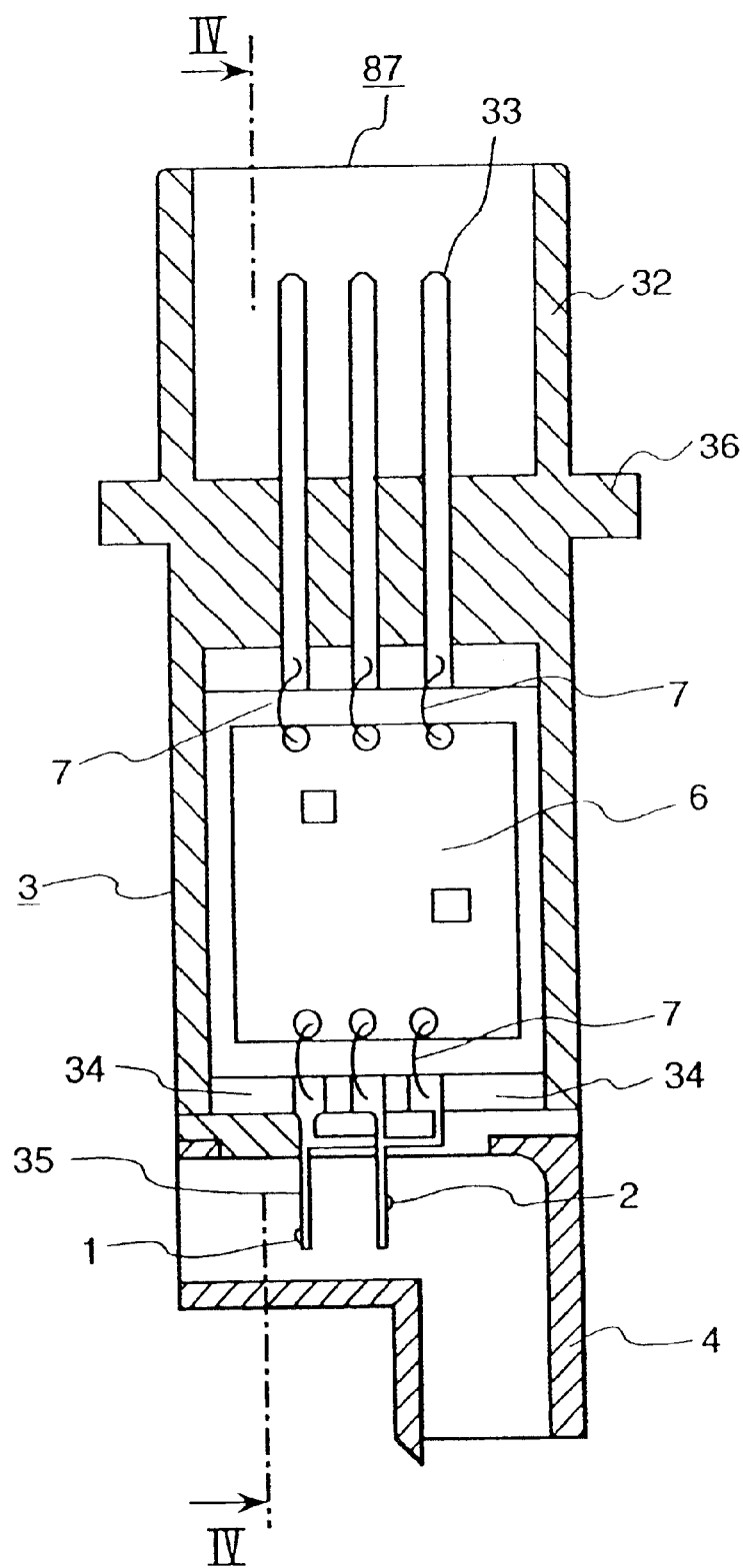
FIG. 3 schematically shows a sectional view of only a measuring part of a thermal-type airflow meter according to another embodiment of the present invention.
Figure 4:
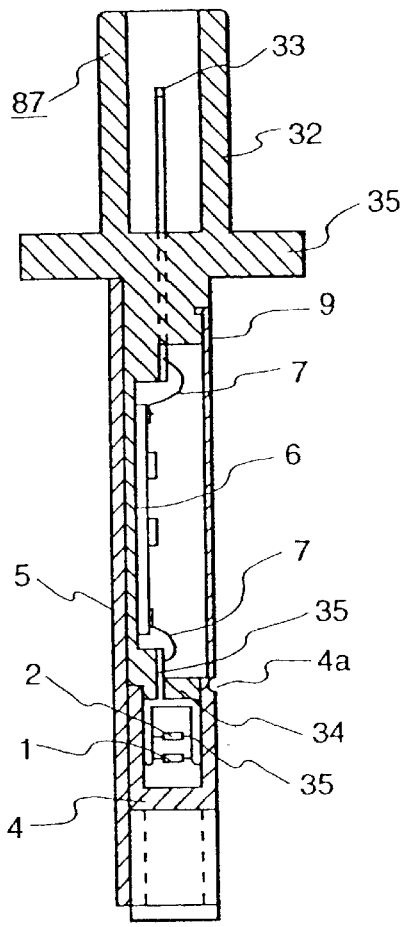
FIG. 4 shows a cross section of the measuring part, as shown in FIG. 3, along the line IV—IV.

Referring to FIGS. 3 and 4, a thermal-type airflow meter according to the another embodiment of the present invention will be described, wherein FIG. 3 schematically shows the sectional view of only a measuring module of an airflow meter, and FIG. 4 shows the cross section of the measuring module, as shown in FIG. 3, along the line IV—IV. Further, the measuring module as shown will be called an airflow meter in the description below.

The airflow meter of the second embodiment comprises the housing 3 having the room, which has an opening only on one side thereof and accommodates therein the circuit substrate 6 as an electronic circuit, and fixedly holding the terminals 35 for supporting the heating resistor 1 and the thermistor 2. The airflow meter further comprises the subpassage member 4 with a L-character shaped sub-air passage formed therein, in which the heating resistor 1 and the thermistor 2 are located, the metallic base 5 fixedly holding the housing 3 and the subpassage member 4, and the cover 9 for covering the opening of the room of the housing 3 which accommodates the circuit substrate 6 therein.

The housing 3 is a plastic article molded as one body, in which there are included box-like body 31a protectingly accommodating the circuit substrate 6, the connector part 32 having the connector terminals 33 and the fixing parts 34 for firmly holding the supporting terminals 35. The circuit substrate 6 is attached to the bottom of the room of the box-like body 31a. The conductive leads 7 electrically connect the circuit substrate 6 with the connector terminals 33, as well as with the supporting terminals 35 provided with the heating resistor 1 and the thermistor 2 by welding.

The subpassage member 4 is a plastic article, in which an L-character shaped sub-air passage with one right-angled bent portion is formed. The L-character shaped sub-air passage like this can be manufactured as one plastic-molded article. The housing 3 and the subpassage member 4 arranged next thereto are fixed on the metallic base 5, and the cover 9 is fixed to the housing 3, whereby the measuring module 87 of the airflow meter is formed.

The circuit substrate 6 is adhered to the housing 3 in this embodiment, not to the metallic base 5 as in the first embodiment. Further, the housing 3 and the whole of the subpassage member 4 are arranged on the metallic base 5, and the cover 9 is attached to the housing 3, whereby the measuring module 87 is completed as one integrated with the housing and the sub-air passage. Further, if the cover 9 is detachably attached to the housing 3, the adjustment work of the circuit substrate 6 accommodated therein can be easily done.

With such a structure as in this embodiment that the housing 3 and the subpassage member 4 are fixed on the metallic base 5, the accuracy of the positional relationship therebetween can be improved. Further, since the deformation due to the temperature change is suppressed by the metallic base 5 with the mechanical strength, the durability of the airflow meter can be secured. Furthermore, also in this embodiment, since a member is always adhered to different members more than one, the member is not easily removed or separated from another member and therefore the durability and reliability of an airflow meter is much improved.

In this embodiment, as shown in FIG. 4, the subpassage member 4 and the cover 9 are integrated and plastic-molded in thin connecting portion 4a at the end of the subpassage member 4. With this structure, the number of parts can be reduced. Although details are not shown in a drawing and not described, it is easy to person ordinarily skilled in the art to integrate the metallic base 5 and the cover 9 for common use, that is to say, to fixedly put the housing 3 and the subpassage member 4 on the single metallic base 5 and to cover openings of the housing 3 and/or the subpassage member 4.

The features of the thermal-type airflow meter according to the present invention are summarized as follows:

(1) A frame member or a box-like body (called a frame member, hereinafter), having opening on both sides thereof, for protectingly accommodating an electronic circuit, a connector part and fixing parts of members for supporting a heating resistor and a thermistor are integrated and plastic-molded to form a housing member. The connector part and the fixing parts are installed on both opposite sides of the frame member, and a member (called a subpassage member, hereinafter), within which a sub-air passage is formed, is installed on the opposite side to the connector part;

(2) At least the frame member and the subpassage member are fixedly arranged on the same plane as a metallic base member;

(3) The subpassage member is formed as a shell-like plastic-molded article, and an opening of the shell-like article is covered by the metallic base member, whereby the sub-air passage is formed;

(4) One of the openings of the frame member and an opening of the subpassage member are both covered by the metallic base member;

(5) Another opening of the frame member is covered by a cover member; and (6) Each of the housing member, the subpassage member, the metallic base member and the cover member is adhered to more than one different member.

In the following, description will be done of mounting of the airflow meter as mentioned above.

Figure 5:
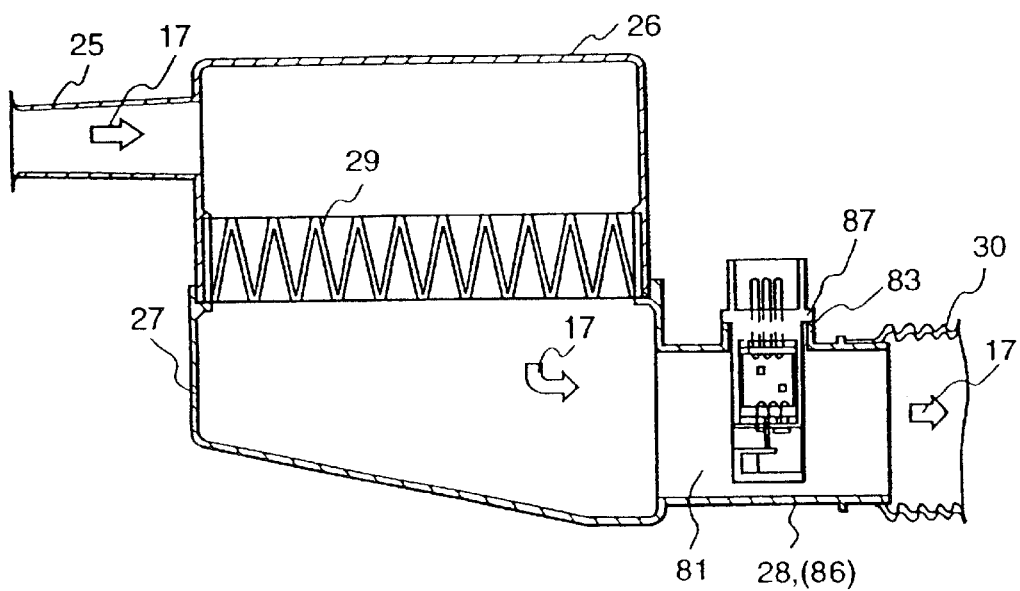
FIG. 5 schematically shows a sectional view of a part of an example, in which the thermal-type airflow meter according to the present invention is equipped on an internal combustion engine.

FIG. 5 schematically shows a sectional view of a part of an example, in which the thermal-type airflow meter according to the present invention is equipped in an internal combustion engine. In this example, a part of an air cleaner installed in an engine room is used as an airflow meter body. Further, this figure shows an intake air system for an internal combustion engine equipped with the airflow meter according to the embodiment as shown in FIG. 1.

In the figure, the intake air system of an internal combustion engine has an air cleaner, an airflow meter and an intake air duct. The air cleaner comprises upstream-side case member 26 with introduction duct 25 for taking fresh air and downstream-side case member 27 with coupling duct 28, wherein the coupling duct 28 is used as a member corresponding to the airflow meter body 86 in the first embodiment. Between both case members 26 and 27, there is fixedly put filter 29 for removing dust from air.

Fresh air is taken in, as shown by left-hand end arrow 17 in the figure, and accordingly clean air from which dust is removed by the filter 29, flows through the coupling duct 28, as shown by right-hand end arrow 17. The insertion hole 83 is bored in the duct 28. The measuring module 87 is inserted through the hole 83 and screwed to the duct 28.

In this manner, since the duct 28, a part of the air cleaner, can be used as the main air passage 81, a special airflow meter body is not needed. Accordingly, only the measuring module 87 can be put on the market as an economical module of an airflow meter.

As described above, another feature of the airflow meter of the present invention is in that instead of the special airflow meter body 87, the fixing mount 82 and the insertion hole 83 are provided in a part of the intake air system, such as an air cleaner, a coupling duct, a throttle body, an intake manifold and so on, and the measuring module 87 is attached, whereby an airflow meter is integrated as a part of an intake air system.

Namely, an intake air system, to which an airflow meter of the present invention is applied, has the structure that a part of the intake air system, enumerated as above, is provided with the fixing mount 82 and the insertion hole 83, by means of which a thermal-type airflow meter of the present invention is attached.

Figure 6:
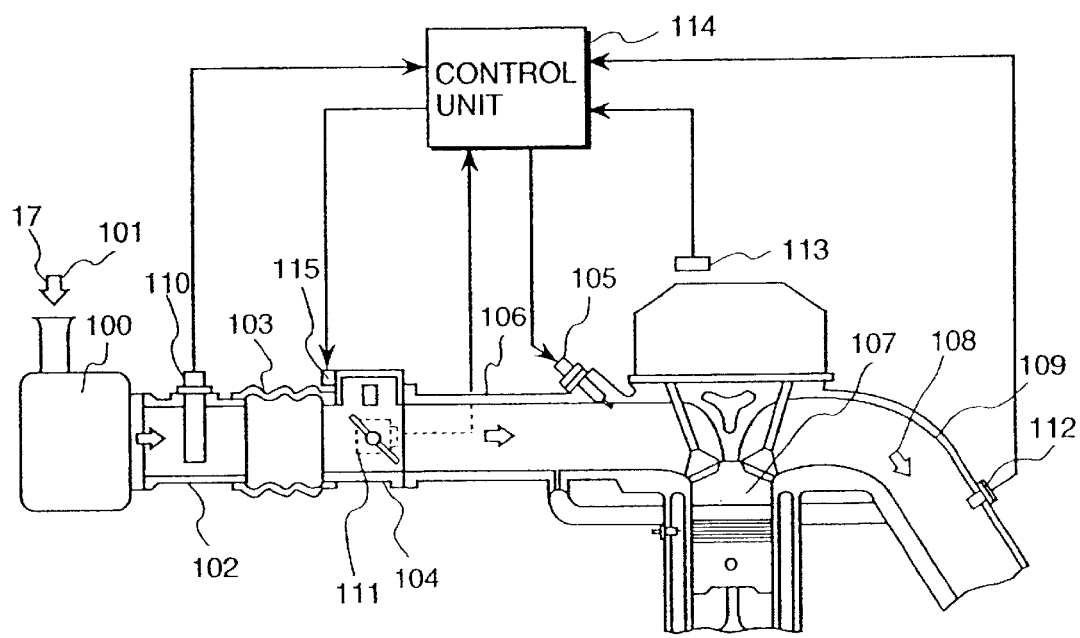
FIG. 6 schematically shows an electronic-controlled fuel injection control system for an internal combustion engine, in which the airflow meter according to the present invention is used.

In the following, description will be made of an electronic-controlled fuel injection control system for an internal combustion engine, in which the airflow meter according to the present invention is used. FIG. 6 schematically shows such control system.

In the figure, intake air 101 taken by air cleaner 100 is led to engine cylinder 107 through a part of body 102 of the air cleaner, duct 103, throttle body 104 and manifold 106 with fuel injector 105. On the other hand, exhaust gas 108 occurring within the engine cylinder 107 is discharged through exhaust manifold 109.

Control unit 114 is supplied with an air flow rate signal generated from module 110 as an airflow meter, a throttle valve opening signal produced by throttle angle sensor 111, an oxygen signal generated by oxygen sensor 112 equipped in the exhaust manifold 109, and a rotational speed signal produced by engine rotation sensor 113.

Receiving those signals, the control unit 114 carries out a predetermined calculation to determine an appropriate amount of fuel to be injected and an opening of an idle air control valve. Based thereon, the injector 105 and the idle air control valve 115 are controlled. With this, the electronic fuel injection control for an internal combustion engine can be carried out by using the airflow meter.

According to the present invention, an airflow meter, which is excellent in the dimensional accuracy, has less degradation in the durability and is compact in its structure, can be easily manufactured, even if it has a sub-air passage with the complicated figure, such as U character, as shown in FIGS. 1 and 2. Accordingly, it becomes possible to provide an airflow meter, which is excellent in its accuracy and durability and easy in its installation.

What is claimed is:

1. An assembly for a thermal air flow meter, said assembly comprising:

a sub-air passage member including a bent portion and constituting a wall for a sub-air passage in which a heating resistor is disposed, the sub-air passage being adapted to be installed in a main air passage;

a metallic base for installing a circuit substrate; and a housing in which a terminal connector is accommodated, wherein each of the sub-air passage member, the metallic base and the housing includes a connecting surface for connection with the other two members.

2. The assembly according to claim 1, comprising more than one connecting surface which are disposed along different directions relative to each other.

3. The assembly according to claim 1, wherein the metallic base is provided with projections and/or grooves and the sub-air passage member and the housing are coupled to the metallic base through the projections and/or grooves.

4. The assembly according to claim 1, further comprises a cover member connected to the housing and covering a part of a space in the housing where the circuit substrate is disposed, wherein the sub-air passage member is sandwiched between the housing and the covering member.

* * * * *